United States Patent [19]
Haerther et al.

[11] 3,936,798
[45] Feb. 3, 1976

[54] INDICATOR DISPLAY MECHANISM

[75] Inventors: Lester W. Haerther; Leo P. Kammerer, both of Cedar Rapids, Iowa

[73] Assignee: Rockwell International Corporation, El Segundo, Calif.

[22] Filed: Oct. 29, 1974

[21] Appl. No.: 518,439

[52] U.S. Cl. .......................... 340/27 NA; 73/178 R
[51] Int. Cl.² ......................................... G08G 5/00
[58] Field of Search......... 340/27 R, 27 AT, 27 NA, 340/325; 73/178

[56] References Cited
UNITED STATES PATENTS

| | | | |
|---|---|---|---|
| 2,796,594 | 6/1957 | Chombard | 73/178 |
| 2,941,400 | 6/1960 | Nesbitt | 340/27 AT |
| 3,162,834 | 12/1964 | Schweighofer et al. | 73/178 |

Primary Examiner—Marshall M. Curtis
Attorney, Agent, or Firm—Richard W. Anderson; Robert J. Crawford

[57] ABSTRACT

A drive mechanism for positioning a moveable indicator in rotation about, and/or radial displacement with respect to, a fixed reference index. Dual dial cord drives are employed which are driven from respective inputs definitive of the rotation and radial displacement to be individually or compositely imparted to the moveable indicator. The pair of dial cords are attached circumferentially to diametrically opposed portions of a cylinder with the moveable indicator extending on a diameter common to those portions. The cylinder portions are confined between, and maintained in sliding tangential engagement with, respective ones of a pair of space-separated, fixed-mounted channel guides. Implementations of the cylinder portions are exampled as diametrically opposed segments of a cylinder, diametrically opposed points on a ring, and diametrically opposed circumferential extremes of a cylindrical plate.

16 Claims, 18 Drawing Figures

LEFT SIDE

FIG. 11

FRONT ELEV

FIG. 12

RIGHT SIDE

FIG. 13

TOP

FIG. 14

ROLL COMMAND+, COMMAND BARS CCW
ROLL COMMAND−, COMMAND BARS CW
PITCH COMMAND+, COMMAND BARS UP
PITCH COMMAND−, COMMAND BARS DOWN

INDICATOR DISPLAY MECHANISM

This invention relates, generally, to indicator mechanisms and, more particularly, to an improved means for driving a moveable indicator member with respect to a fixed reference index wherein the moveable indicator member is to be both radially translatable and rotatable with respect to the viewing axis of said fixed index.

The present invention is particularly applicable to an instrument for use in conjunction with a vehicle which may exhibit changing attitudes in both pitch and bank to present, by means of a single moveable indicator member reading against a fixed reference, either the existing attitude of the vehicle in pitch and/or bank or, alternatively, a commanded attitude in pitch and/or bank to be attained by the vehicle.

The present invention finds special usage in steering or horizon indicating instruments for aircraft, and will be described specifically herein in that environment. However, the indicator mechanism to be described is equally applicable as a steering or attitude indicator for other types of vehicles (such as, for example, a submarine) wherein the vehicle is capable of assuming attitudes in both pitch and bank from a reference attitude and is capable of attaining commanded attitudes in pitch and/or bank.

Means are known in the aircraft instrumentation art for providing combination attitude indications either as a measure of existing attitude, or as a steering command indication. For example, U.S. Pat. No. 3,162,834 to Schweighofer et al describes an aircraft instrument of the type providing a command indicating member cooperating with a fixed index symbol with the command indicator being both displaceable from and rotable about the index and to provide pitch, bank, or combination pitch and bank commands in response to pitch and/or command input signals. Likewise, U.S. Pat. 3,654,597 to Cox relates to a drive mechanism for a command indicator like that of the Schweighofer et al reference in which a novel cam drive positioning means is employed in conjunction with a differential servo to provide both separate and composite pitch and bank commands.

Aircraft instrumentation mechanisms of a type commonly referred to as "artifical horizon" indicators are also known in the art (see, for example, Chombard U.S. Pat. No. 2,796,594) wherein a single indicating member is moveable with respect to a reference in both pitch and bank to provide an indication of the existing attitude of the craft in pitch and bank with respect to the horizon.

Each of the referenced teachings attains the composite command display or existing attitude indication by a relatively complex electrical, mechanical or electromechanical positioning means.

The primary object of the present invention is to provide a relatively simple and comparatively far less expensive and complicated drive mechanism for positioning a moveable indicator member with respect to a fixed reference such that the indicator is capable of providing a composite pitch and bank command, or an indication of existing vehicle attitude.

A further object of the present invention is the provision of an indicator means and associated driving mechanism which may be implemented with a substantial reduction in volumetric requirements as compared to known mechanisms of the type.

The present invention is featured in the provision of a combination mounting and drive means for an indicator member whereby a generally elongated indicator member is fixed-mounted to, and extends along the common diameter of, diametrically opposed peripheral portions of a cylinder with each termination being confined in tangential engagement with one of a pair of parallel space-separated channel members. Each of the end terminations is fixed in driving engagement with oppositely extending axially aligned ends of a dial cord, which ends are respectfully extended beyond the common-diameter defined point of tangency of the terminating member and affixed circumferentially thereon. The dial cords are driven by an associated one of a pair of differentially servo energized motors such that the moveable indicator is capable of being translated with respect to the fixed refernce index and rotatable with respect thereto in accordance with the driven position of motor-driven pulleys over which the dial cords are carried.

Figure 1:
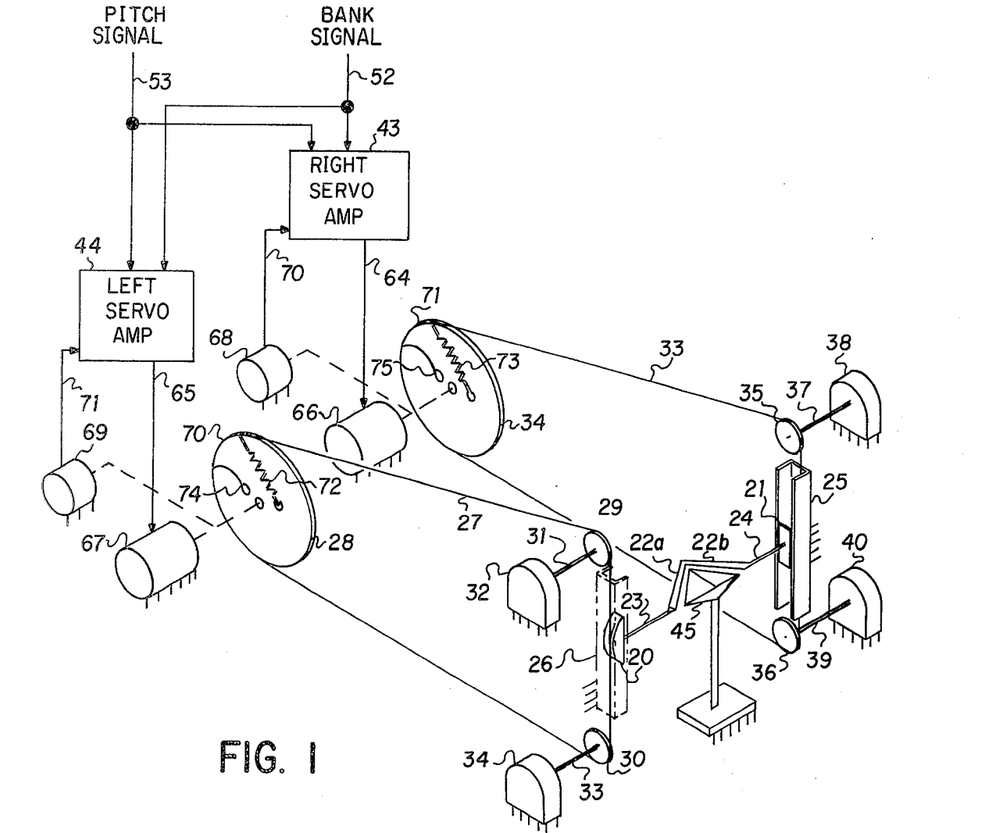
FIG. 1 is a functional mechanical diagram of an indicator mechanism in accordance with the present invention.
Figure 2:
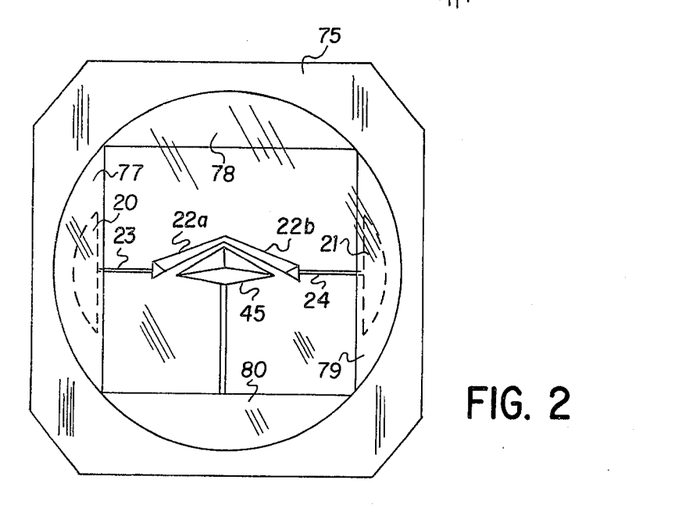
FIG. 2 is an observer's view of the moveable indicator and fixed reference member of FIG. 1.

These and other objects and features of the present invention will become apparent upon reading the following description with reference to the accompanying drawings in which:

FIGS. 1 and 2 are representative of a preferred embodiment of the present invention wherein the moveable indicator member functions as a command indicator in conjunction with a fixed reference index to present an observer with a commanded pitch and bank (or composite pitch-bank) attitude which it is desired that the vehicle attain.

With reference to FIG. 1, the mechanism is functionally depicted as employing dual dial-cord, drive-type assemblies. The command indicator (the moveable indicator element) here comprises a pair of joined V-bars $22_a$ and $22_b$ which cooperate with a fixed delta-shaped reference 45 to present the command. As depicted in FIGS. 1 and 2, the indicated command is zero; that is, the V-bar assembly $22_a$—$22_b$ is juxtaposed with the transverse extremes of the fixed delta reference member 45, indicating that a command attitude has been attained. The V-bar assembly $22_a$—$22_b$ is diametrically attached, by means of mounting arm members 23 and 24, between rocker members 20 and 21, with the respective rocker members riding in associated fixed guide channels 25 and 26. The guide channels 25 and 26 are fixed-mounted in spaced-parallel relationship such that the rocker members 20 and 21 are confined between respective tangential points of engagement on the side extremes (bottoms) of the respective channels.

As will be further described, the rocker member terminations of the moveable command indicator assembly, of which the V-bar $22_a$—$22_b$ is an integral part, are utilized in conjunction with associated dial cord drives which collectively rotate and translate the command bar assembly with respect to the viewing axis of the fixed reference index member 45.

The left rocker member 20 cooperates with a first dial cord 27 which is carried over an associated drive pulley 28 and idler pulleys 29 and 30 so as to carry the dial cord ends into tangential engagement with the circumference of rocker 20. Dial cord 27, is carried over an idler pulley 29 which rotates about a fixed axis 31 with respect to a fixed-mounting means 32, and over idler pulley 30 which rotates about a fixed axis 33 with respect to a fixed-mounting means 34 such that the ends of cord 27 extend in axially aligned tangential engagement with the circumference of rocker member 20.

Likewise, the right-hand rocker member 21 is driven by a right-hand dial cord 33 which is carried over an idler pulley 35 rotating about a fixed axis 37 with respect to a fixed-mounting means 38 and an idler pulley 36 rotating about a fixed axis 34 with respect to fixed-mounting means 40 such that the ends of dial cord 33 extend in axial aligned tangential engagement with the circumference of rocker member 21.

Dial cord 27 is driven by a drive pulley 28 and might have a first end thereof carried through an opening 70 in the periphery of pulley 28 and spring loaded by means of spring member 72 to the pulley 28. The other end of the dial cord 27 might be carried through the peripheral opening 70 in drive pulley 28 to a termination 74 on the pulley 28, with the spring member 72 thereby conventionally spring loading dial cord 27 into a taut relationship with respect to the associated idler pulleys 29 and 30 and the driving terminations thereof on rocker member 20.

The dial cord 33 is associated with the right-hand rocker member 21 and is driven by drive pulley 34. Dial cord 33 is carried over drive pulley 28 and through opening 71 in the periphery thereof to a spring member 73 by means of which it is anchored to the drive pulley 34. The other end of dial cord 33 may be carried similarly around drive pulley 34 through peripheral opening 71 into termination at point 75 on the drive pulley 34.

FIG. 2 shows an observer's view of the indicator $22_a$—$22_b$ and fixed index 45, looking into and slightly down on the assembly. A front face housing 75 is formed with a circular opening carrying a transparent face plate 76. Appropriate masking shields 77, 78, 79 and 80 may be arranged to shield the dial cord mechanism from view. Sectors 20 and 21 are indicated in phantom lines as they might be located behind respective masks 77 and 79.

Figure 10:
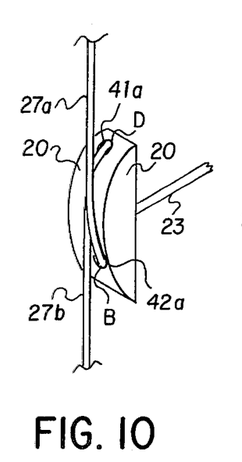
FIG. 10 illustrates dial cord drive termination mounting means with respect to one of the moveable indicator terminating means of a first embodiment of the invention.

As best depicted in FIGS. 10–13, the driving ends of each of the dial cords are carried to a point of tangential engagement with the associated one of the rocker members 20 and 21, and beyond the point of tangency defined by the common diameter of the rocker members 20 and 21, to an anchor point on the circumference of the rocker member. FIG. 10 illustrates respective driving ends $27_a$ and $27_b$ of the left dial cord 27 and their driving relationship with rocker member 20. With reference to FIG. 10, dial cord end $27_a$ is seen to be carried over the circumference of sector 20 to an anchor point B which lies beyond the common diameter defined point of tangency on the circumference of rocker member 20. Similarly, the lower end $27_b$ dial cord 27 is carried upwardly past the diameter defined point of tangency on the circumference of rocker member 20 to an anchor point D.

Figure 11:
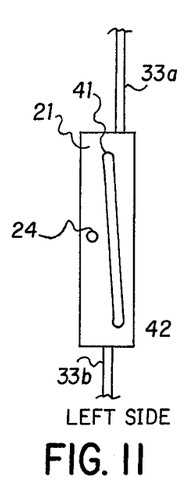
FIGS. 11, 12, 13 and 14 represent respective left side, front elevation, right side and top views of a particular moveable indicator terminating means and its cooperative relationship with the associated driving dial cord.
Figure 12:
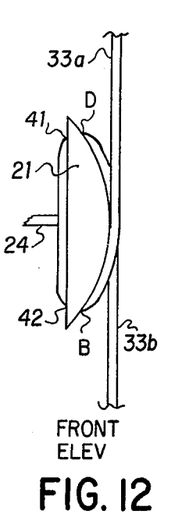
Figure 13:
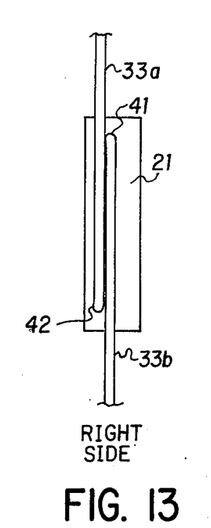

As depicted in FIGS. 11–13, which relate to the right rocker member 21, the dial cord may be carried through respective through-holes 41 and 42 (drilled generally radially inward through the rocker member) in a continuous threaded fashion for ease of assembly. Dial cord 33 is illustrated as being carried down and over the circumference of rocker member 21, through hole 42, up the inner surface of rocker member 21, through hole 41 and down across the circumference of the rocker member 21, such that the respective ends $33_a$ and $33_b$ of dial cord 33 each exhibit a point of tangential engagement with the circumference of rocker member 21. Again, for purposes of assembly expediency, the respective holes 41 and 42, through which the dial cord 33 is threaded (and likewise the dial cord 27 through like holes in the left-hand rocker member 20), may be offset by an amount corresponding essentially to a dial cord diameter such that, as illustrated in FIG. 13, the dial cord ends are in juxtaposed tangential alignment on the rocker circumference.

It might be emphasized that with reference to FIG. 10, the respective dial cord ends might simply be affixed at respective termination points B and D on the circumference of the associated rocker member. The means depicted in FIGS. 11–13 for affixing the dial cords in driving arrangement with the associated one of the rocker members is a preferred arrangement.

Figure 14:
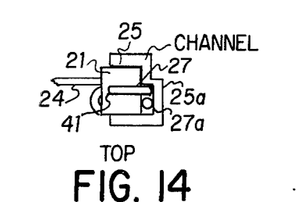

The moveable indicator of the above described embodiment extends generally along the diameter common to each of the drive sectors 20 and 21. Mechanical rigidity of the assembly is uniquely realized by the maintenance of a point of tangential engagement of the respective drive sectors with the associated one of the guide channels 25 and 26. The preferred arrangement of affixing the respective drive cords in driving relationship with the drive sectors, as depicted in FIGS. 11–13, causes the ends of the dial cords to lie in side-by-side relationship as they address the circumferential portion of the associated drive sector. Reference is made to FIG. 14, wherein the right-hand channel 25 is shown in its cooperative relationship with the right-hand drive sector 21 in a top view. It is noted that channel 25 maintains a sliding and confining engagement with the respective planar surface sides of the sector 21, and a portion of the periphery of the sector 21 is maintained in tangential sliding engagement with a bottom portion of the guide channel 25. With the dial cords affixed to the sector 21 as depicted in FIGS. 11-13, the channel 25 may be provided with a grooved portion $25_a$ sufficient in depth to accommodate a diameter of the dial cord 33 and sufficient in width to accommodate the side-by-side position of the respective ends of dial cord 33. This arrangement provides a mechanical rigidity as concerns the cooperative relationship between the sector 21 and guide channel 25, permitting the sector 21 to slide within the channel with provision made for clearance of the dial cord drive associated with that sector. In a preferred embodiment, the drive sectors 21 and 20 might be made of metal to which the associated indicator mounting arms 23 and 24 may be affixed as by brazing, while the channel members 25 and 26 might be fashioned of Teflon material to provide a minimal frictional engagement with the drive sector to enable a mechanically rigid sliding relationship therewith.

The dial cord driving pulleys 28 and 34 are positioned independently by left and right servos which operate differentially in response to pitch and bank indicative input signals. As will be further described, electrical commands to the left and right servos are independent and, as such, various commands of the servos are combined through the dial cord drives to provide a summation of these commands to give the desired motions to the command bar assembly $22_a$–$22_b$. These motions are typically defined as pitch-up, pitch-down, bank-left, band-right, and/or combinations. Thus, the drive pulley 28 associated with the left dial cord 27 may be driven by a servo motor 67 by the output 65 of a left servo amplifier 44 which differentially responds to both pitch and bank indicative input signals 53 and 52. A feedback potentiometer 69 provides a conventional position feedback signal 71 to the left servo amplifier 44. Similarly, the right-hand drive pulley 34 may be driven by a servo motor 66 by the output 64 of a right servo amplifier 43 which differentially responds to both pitch and bank indicative input commands 53 and 52. A feedback potentiometer 68 provides a conventional position feedback signal 70 to the right servo amplifier 43.

Ability of the aforedescribed command bar drive assembly to provide pure pitch indicative motions, pure bank indicative motions and composite motions of pitch and bank is defined by the geometry of the driving mechanism. Since the aforedefined rocker members 20 and 21, as depicted in FIG. 1, comprise diametrically opposed sectors of a cylinder, they cooperate with the respective guide channels 25 and 26 at points of tangency on the circumferences of the rocker members. These points of tangency are depicted in FIGS. 3–9 as respective points 0 and 0'.

Figure 3:
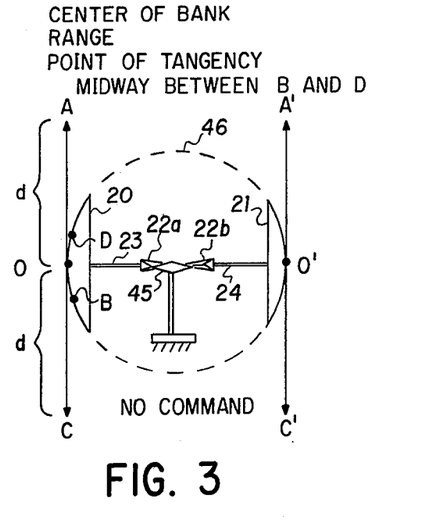
FIG. 3 is a diagrammatic representation of positioning geometry to effect a zero command indication.

In FIG. 3, the moveable indicator comprised of command bars $22_a$ and $22_b$ is indicated in a zero command position and is thus symmetrically disposed with the fixed index 45. It is noted that the respective dial cord ends in this zero-command position each extend from common points of tangency (0 and 0') on the circumference of the respective sectors 20 and 21. In FIG. 3, these common points of tangency, 0 and 0', coincide with the diameter common to each of the sectors 20 and 21.

It is apparent, therefore, that, if each of the left and right dial cords 27 and 33 of FIG. 1 is caused to translate in the same direction by the same amount, the associated ones of the rocker members 20 and 21 will each likewise translate (by sliding within guide channels 25 and 26) in that direction and by that amount so as to provide a pure pitch indication, with the moveable indicator member $22_a$–$22_b$ being translated, without rotation, above or below the fixed reference 45. Similarly, if the dial cords are caused to translate by the same amount, but in respectively opposite directions, the associated drive rockers 20 and 21 will be caused to move around the circular path 46.

Depending, then, upon the relative directions and magnitude of driving displacements of the left and right dial of cords 27 and 33, the indicator mechanism is caused to both rotate about, and translate radially with respect to, the viewing axis of the fixed reference member 45. The driving geometry for variously sensed pitch, bank and composite pitch-bank motions is exampled in FIGS. 3 through 9.

FIG. 3 illustrates a zero-command situation wherein the V-bar members $22_a$–$22_b$ are aligned with the fixed reference 45. The dial cords exhibit a tangential relationship with respective common diameter defined points on the circumference of the respective drive members 20 and 21. For descriptive purposes, the length of the left-hand dial cord extending upwardly is depicted as being equal to $d$, as is the length of the dial cord extending downwardly. Total dial cord length is then defined as $2d$. The upper portion of the dial cord extends from point A (which might correspond to the termination point on the associated drive pulley) past the common diameter defined tangency point to a termination point B, while the lower portion of the left-hand dial cord extends from a point C (which might correspond to its anchor point on the associated drive pulley) past the common diameter defined tangency point on drive sector 20 to a termination point D. The righ-hand dial cord of FIG. 3 is similarly defined in its driving relationship with respect to the right-hand drive sector 21.

Figure 4:
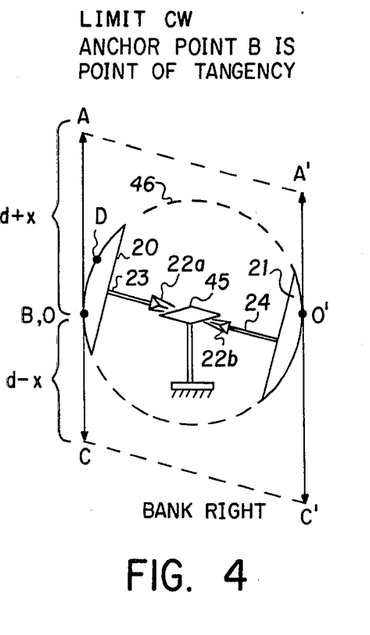
FIG. 4, a diagrammatic representation of positioning geometry to effect a "bank-right" command.

FIG. 4 illustrates the driving geometry resulting from equal and respectively opposite dial cord translations to produce a "bank-right" display. FIG. 4 assumes that the left-hand dial cord is translated upwardly by a distance $x$ such that its working length A-O between the associated drive pulley and the point of tangency on drive sector 20 is defined as $d + x$, while the lower portion C—O of the left-hand dial cord is correspondingly defined as $d - x$. The right-hand dial cord is geometrically depicted as moving by the same amount in the opposite direciton. It is noted that, with respect to either of the dial cords, the amount of dial cord paid off the circumference of the associated drive sector is the same as that wound thereon such that the total length of either cord remains at $2d$. In FIG. 4, the left-hand dial cord is translated upwardly while the right-hand dial cord is translated downwardly, such that a bank-right indication is depicted. FIG. 4 illustrates a clockwise limit as concerns bank indication since the points of tangency of the dial cords correspond to points on the circumference of the sectors at which one end of a dial cord is affixed. Note that in FIG. 4, the point B at which the upper portion of the left-hand dial cord is affixed to the sector 20 now coincides with the point 0 which lies along the horizontal diameter of the working circle 46.

Figure 5:
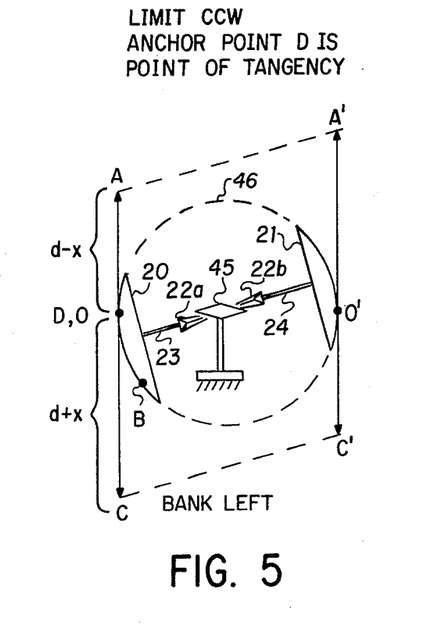
FIG. 5, a diagrammatic representation of positioning geometry to effect a "bank-left" command.

FIG. 5 depicts a left-bank limit indication wherein the dial cords are driven in respective equal and opposite directions. In this case the anchor point D of the lower portion of the left-hand cord coincides with the point 0 lying on the horizontal diameter of the working circle 46.

Figure 6:
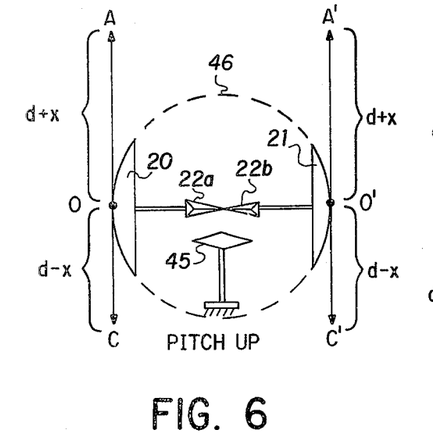
FIG. 6, a diagrammatic representation of positioning geometry to effect a "pitch-up" command.
Figure 7:
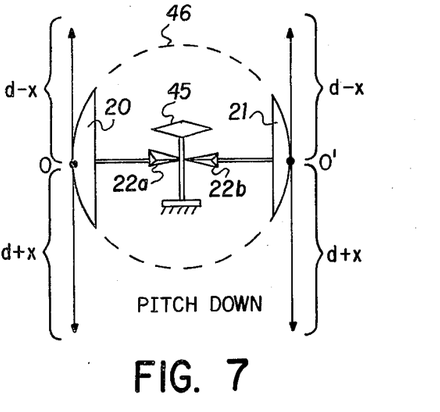
FIG. 7, a diagrammatic representation of positioning geometry to effect a "pitch-down" command.

FIGS. 6 and 7 illustrate respective pitch-up and pitch-down command indications wherein the dial cords are driven in the same direction by the same amount, and a radial translation of the indicator $22_a$—$22_b$ is effected above and below the fixed reference index 45.

Figure 8:
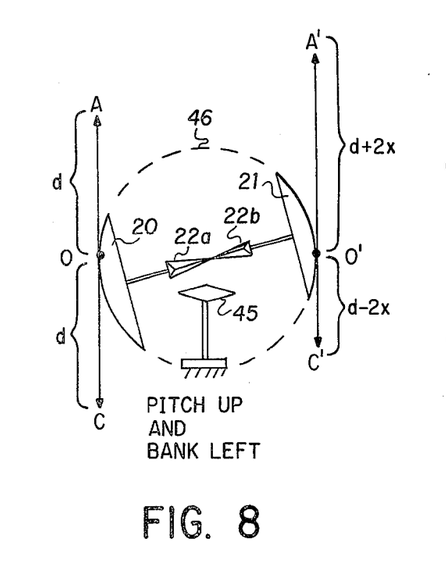
FIG. 8, a diagrammatic representation of positioning geometry to effect a composite "pitch-up and bank-left" command.

FIG. 8 illustrates the geometry in response to a simultaneous pitch and bank input to the differential servo each of assumed magnitude x. In this instance, the left dial cord remains stationary while the right dial cord is driven upwardly by a summation of the pitch and bank commands, namely, 2x, to effect a rotation of the indicator assembly $22_a$—$22_b$ together with a translation thereof such that the resultant composite command is "pitch up by $x$" and "bank left by $x$." In this case, dial cord imparted rotation of the right sector forces a rotation of the left sector to redefine the tangency point of the dial cord ends cooperating with the left sector.

Figure 9:
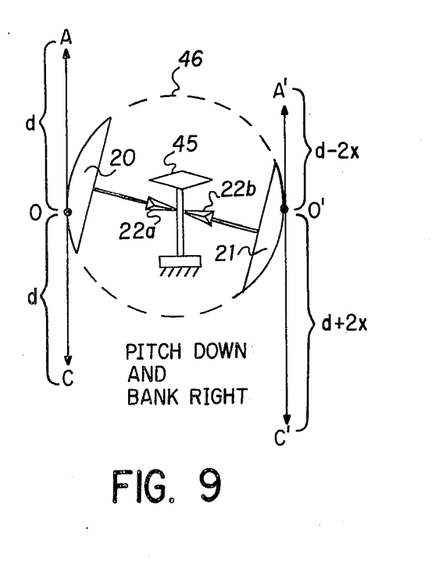
FIG. 9, a diagrammatic representation of positioning geometry to effect a composite "pitch-down and bank-right" command.

FIG. 9 illustrates a combined command of pitch-down and bank-right (each of assumed magnitude $x$). Again, the lefthand sector 20 is caused to roll within its guide channel in accordance with the motion imparted to the right-hand sector 21 by the right-hand dial cord.

Figure 15:
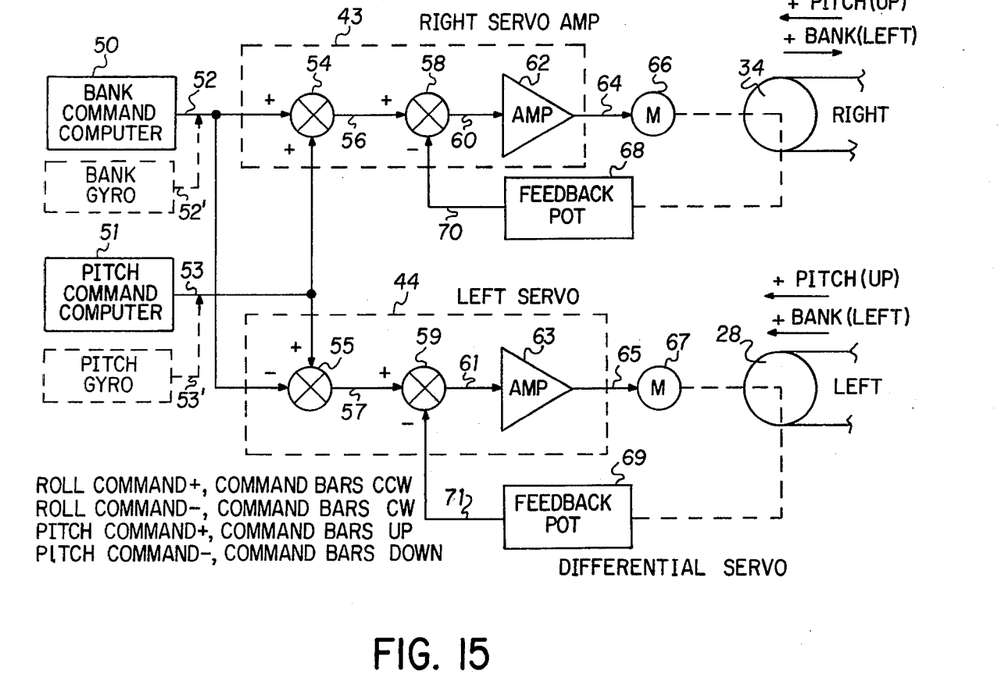
FIG. 15 is a functional block diagram of a differential servo useful in positioning and driving the respective dial cords of the present invention.

FIG. 15 shows a more detailed functional diagram of the right and left servo amplifiers of FIG. 1 and the manner in which they are differentially responsive to pitch and bank input parameters. A bank command computer 50 provides a bank command signal 52 which is applied to each of the right and left servo amplifiers 43 and 44. A pitch command computer 51 provides a pitch command signal 53 to each of the right and the left servo amplifiers 43 and 44. The bank command signal 52 and pitch command signal 53 are combined additively in a signal combining means 54 associated with right servo amplifier 43, and subtractively in a signal combining means 55 associated with left servo amplifier 44. The pitch signal 53 is applied to each of the servo amplifiers in the same sense, while the bank command signal 52 is applied to the respective servo amplifiers in mutually opposite sense.

The right servo amplifier comprises a further signal mixing means 58 to which the output 56 from signal combining means 54 (corresponding to the sum of the pitch and bank signals) is applied as a first input. The output 60 from signal combining menas 58 is applied to an amplifier 62 the output 64 of which drives the right servo motor 66 which positions the drive pulley 34 associated with the right dial cord 33. Feedback potentiometer 68 is driven by motor 66 and provides a feedback signal 70 in subtractive sense to signal mixing means 58.

The left servo amplifier comprises a further signal mixing means 59 to which the output 57 from signal mixing means 55 (corresponding to the difference between the pitch and bank input command signals) is applied. The output 61 from combining means 59 is applied to an amplifier 63 the output 65 of which drives the left servo motor 67 to position the left drive pulley 28 associated with the left dial cord 27. Feedback potentiometer 69, provides a feedback signal 71 for application in subtractive sense as a second input to combining means 59.

Thus, a pitch input command signal 53 in the absence of a bank command input signal 52 will cause each of the left and right servo motors to rotate in the same direction by the same amount to provide a pure pitch indication. Correspondingly, a bank input command signal 52 in the absence of a pitch command signal will cause the respective left and right servo motors to rotate in mutually opposite directions by the same amount so as to provide a pure bank indication. The presence of both a pitch command signal 53 and a bank command signal 52 effects relative rotations of the respective dial cord pulleys 34 and 28 such that a composite motion comprised of rotation proportional to bank and translation proportional to pitch is realized.

In the above described embodiment, the terminating means for the moveable indicator $22_a$ and $22_b$ comprised diametrically opposed like segements of a cylinder with the moveable indicator extending between segments on the common diameter therebetween. The drive mechanism of the present invention may equally be applicable to other configurations as concerns the driven terminating members of the moveable indicator member. The aforedescribed diametrically opposed like cylindrical segments are, in general, diametrically opposed portions of a cylindrical member and need not be limited to the diametrically opposed like cylindrical segments illustrated in FIGS. 1 – 14. Further, the moveable indicator obviously need not be limited to the converging V-bars $22_a$—$22_b$ herein discussed.

Figures 16, 17, 18:
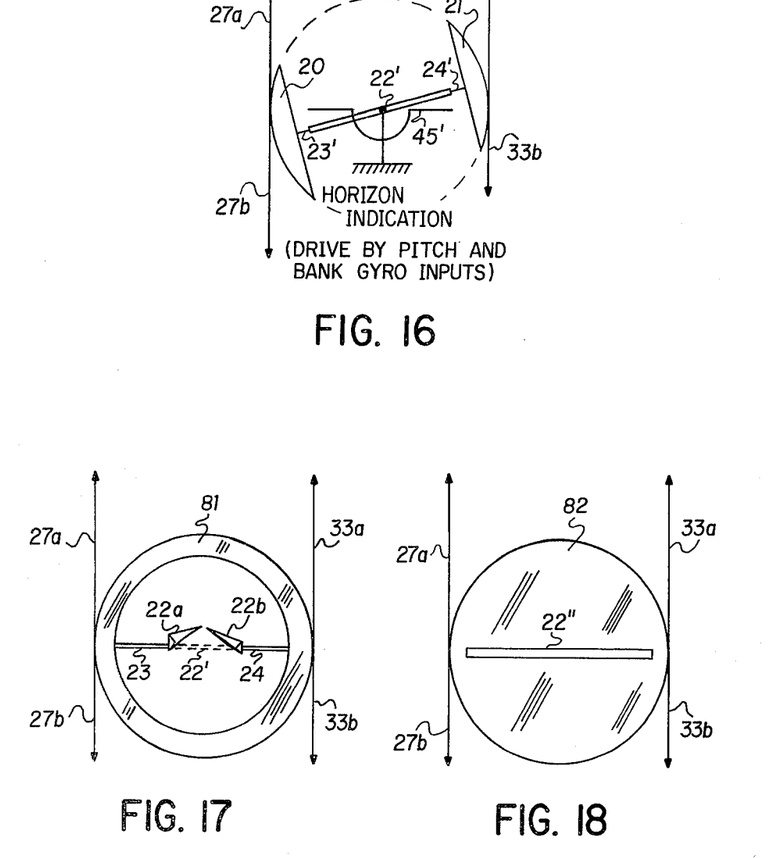
FIGS. 16, 17 and 18 represent respective further embodiments of moveable indicator end drive termination means in accordance with the present invention.

FIG. 16 illustrates as alternative indicating mechanism wherein the moveable indicator comprises a longitudinally extending bar member 22' with end terminations 23' and 24' affixed to diametrically opposed cylindrical segments 20 and 21. The arrangement of FIG. 16 might be driven in accordance with respective bank gyro and pitch gyro input signals 52' and 53' (as alternatively depicted in FIG. 15) to provide an artificial horizon indication with respect to a fixed reference index 45'. As a still further alternative, the arrangement of FIG. 16 might be driven in conjunction with pitch and bank command signals to provide a command indication as opposed to an attitude indication.

Since the previously described diametrically opposed cylindrical segments which cooperate with the respective dial cords are generally diametrically opposed portions of a cylinder per se, the moveable indicator might be diametrically extended between, and along the diameter of a ring member 81 as depicted in FIG. 17. Respective dial cords 27 and 33 are shown affixed to the circumference of the ring in a manner like that of the cylindrical segment indicator terminations. FIG. 17 illustrates a further alternative whereby the indicator member V-bars $22_a$ and $22_b$ need not be integral (joined at the apex) since they do not form a structural support function as in the embodiment of FIG. 1. Alternatively still, the arrangement of FIG. 17 might be utilized in conjunction with a diametrically extending bar 22' in lieu of V-bars $22_a$—$22_b$ and utilized in conjunction with pitch and bank gyro inputs to the associated servo motor drive to serve as a horizon indication.

FIG. 18 illustrates a still further alternative wherein the dial cords may be affixed in driving relationship, as previously described, on the periphery of a cylindrical plate 82, with the moveable indicator 22' comprising a diametrically extending index painted on, or otherwise affixed to, the viewable surface.

In each of the alternatives, as in the preferred embodiment of FIGS. 1-13, the moveable indicator extends between diametrically opposed like portions of a cylindrical member with the cylindrical member maintaining a sliding tangential engagement with the respective left and right guide channels for mechanical rigidity, and being translatable within the guide channels as well as rotatable therein to effect the aforedefined pure pitch, pure bank and composite pitch-bank indications with respect to the fixed reference 45.

The present invention thus provides a driving means for an indicator which is radially translatable with respect to a fixed reference to indicate pitch and rotatable with respect to that reference to indicate bank commands or existing attitudes. The drive mechanism employs a differentially positioned dual dial cord arrangement without the mechanical complexity and attendent expense of gyro stabilized plural gimbal arrangements etc. currently employed in the art. Further, means employed in the art to effect a composite indication as herein described do not readily lend themselves to minimal space implementations as does the present drive means. For example, the arrangement provided by the present invention permits a command indicator drive arrangement to be "built around" a standardized gyro horizon mechanism such that the resulting complete instrument provides both attitude and command indications.

Although the present invention has been described with respect to particular embodiments thereof, it is not to be so limited as changes might be made therein which fall within the scope of the invention as defined in the appended claims.

What is claimed is:

1. An indicator mechanism comprising: a fixed reference index member symmetrically disposed about the longitudinal viewing axis of an instrument, a moveable indicating member supported in a plane substantially normal to the longitudinal axis of said instrument and extending in said plane symmetrically with respect to, and transverse of, the vertical center axis of said instrument; drive means for displacing said indicating member within the plane defined thereby and transversely of said instrument longitudinal axis in accordance with a first input parameter and for rotating said indicating member about a point on said vertical center axis in accordance with a second input parameter, said drive means comprising termination means between which respective ends of said indicating members are extended, said terminating means comprising at least diametrically opposed peripheral portions of a cylinder with said indicating member extending along that diameter of said cylinder; first and second dial cords in respective driving engagement with said termination means, each said dial cord being of fixed length and having first and second portions thereof oppositely extending in peripheral engagement with said termination means and carried circumferentially over the arcuate periphery thereof and affixed thereto at a circumferential point beyond the point of tangency defined by the diameter along which said indicating member extends, first and second drive pulley means over which said first and second drive cords are respectively carried, and means for rotating each of said drive pulleys as a predetermined differential function of said first and second input paramenters.

2. The indicator mechanism of claim 1 comprising first and second fixed-mounted guide means within which diametrically opposed portions of said terminating means are respectively slidably received, said guide means being parallel space-separated to provide a first surface in sliding tangential engagement with the circumferential extremes of said diametrically opposed portions of said terminating means and comprising further surfaces in sliding engagement with the respective opposed planar surfaces of respective ones of said diametrically opposed portions of said terminating means.

3. The indicator mechanism of claim 2 wherein the arc defined by said diametrically opposed portions of said terminating means is greater than that defined by the respective points at which the associated one of said dial cords is affixed thereto.

4. The indicator mechanism of claim 3 where said guide means comprises channel members fixed-mounted parallel to the vertical center axis of said instrument with the bottom of said channels in tangential sliding engagement with the arcuate edge of the associated one of said diametrically opposed portions of said terminating means and with the sides of said channels in sliding engagement with the respective circular segment defined surfaces of the associated one of said diametrically opposed portions of said terminating means.

5. The indicator mechanism of claim 4 wherein said terminating means between which respective ends of said indicating members are extended, comprises diametrically opposed mounting points on an annular ring to which the ends of said indicative members are respectively affixed and between which said indicating member diametrically extends.

6. The indicator mechanism of claim 4 wherein said terminating means between which respective ends of said indicating members are extended comprises a cylindrical plate member with said indicating member being affixed to a planar surface thereof.

7. The indicator mechanism of claim 4 wherein said terminating means between which respective ends of said indicating members are extended comprises first and second diametrically opposed segments of a cylinder with said indicating member extexding along the common segment-defining diameter of said cylinder.

8. The indicator mechanism of claim 4, comprising fixed-mounted idler pulley means over which said respective ends of each of said dial cords are carried on a common axis to a point of tangential engagement with the associated one of said diametrically opposed portions of said terminating means.

9. The indicator mechanism of claim 8 wherein the bottom of each of said guide channel members is formed with a groove having a depth substantially equal to the diameter of said dial cords and a width substantially equal twice the diameter of said dial cords, said groove receiving and providing space accommodation for the respective affixed ends of the associated one of said dial cords.

10. The indicator mechanism of claim 9 wherein said means for rotating each of said drive pulleys comprises first and second servo motors respectively connected to drive an associated one of said drive pulleys, first and second servo amplifiers providing a driving signal to each of said motors, means additively combining said signals proportional in sense and magnitude to said first and second input parameters and providing an input signal to one of said servo amplifiers, and means subtractively combining said signals proportional to said first and second input parameters and providing an input signal to the other one of said servo amplifiers.

11. The indicator mechanism of claim 10 wherein said first input signal comprises a signal proportional to the existing vehicle bank attitude, and said second input signal comprises a signal proportional to the existing vehicle pitch attitude.

12. The indicator mechanism of claim 10 wherein said first signal comprises a signal proportional to a command bank attitude, and said second input signal comprises a signal proportional to a command pitch attitude.

13. The indicator mechanism of claim 10 comprising drive limit means whereby each of said dial cords is drive limited in axial translation to effect an angular rotation of said moveable indicating member less than one-half the arc defined between the respective circumferential points at which said first and second dial cord portions are affixed.

14. The indicating mechanism of claim 13 wherein said terminating means between which respective ends of said indicating members are extended comprises diametrically opposed mounting points on an annular ring to which the ends of said indicative members are respectively affixed and between which said indicating members diametrically extend.

15. The indicating mechanism of claim 13 wherein said terminating means between which respective ends of said indicating members are extended comprises a cylindrical plate member with said indicating member being affixed to a planar surface thereof.

16. The indicating mechanism of claim 13 wherein said terminating means between which respective ends of said indicating members are extended comprises first and second diametrically opposed segments of a cylinder with said indicating members extending along the common segment-defining diameter of said cylinder.

* * * * *